United States Patent [19]

Hildebrecht

[11] 4,179,949

[45] Dec. 25, 1979

[54] CONTROL PEDAL

[75] Inventor: Harold V. Hildebrecht, Cleveland, Ohio

[73] Assignee: Towmotor Corporation, Mentor, Ohio

[21] Appl. No.: 919,886

[22] Filed: Jun. 28, 1978

[51] Int. Cl.[2] .................. G01M 1/168; G01P 3/04; G01H 5/00

[52] U.S. Cl. .................. 74/474; 74/479; 74/513; 74/560

[58] Field of Search .................. 74/512, 513, 514, 479, 74/480 R, 480 B, 560, 474

[56] References Cited

U.S. PATENT DOCUMENTS

| | | | |
|---|---|---|---|
| 3,995,510 | 12/1976 | Yost | 74/512 X |
| 4,010,982 | 3/1977 | Grossart | 74/512 X |
| 4,026,164 | 5/1977 | Mozingo | 74/512 X |
| 4,064,769 | 12/1977 | Amdall et al. | 74/512 X |

*Primary Examiner*—Samuel Scott
*Assistant Examiner*—Don E. Ferrell
*Attorney, Agent, or Firm*—James R. Bell

[57] ABSTRACT

A foot-operated accelerator pedal (18) in a lift truck (10) commonly provides for control of forward (14) and reverse (16) direction as well as acceleration (12) of the truck (10). Directional control portions (22) (24) of the pedal (18) are mounted on and movable relative to the accelerator control portion (20) for actuating switches upon making direct contact with the switches which are mounted on or near the pedal (18). A solution is offered to the common problem of relatively short wear life associated with such direct contact switches. The solution includes a pedal (18) having accelerator (20) and directional control portions (22) (24) and switches (80F) (80R) which are actuated without the need for direct contact with their actuators (92).

7 Claims, 3 Drawing Figures

CONTROL PEDAL

TECHNICAL FIELD

This invention relates generally to machine elements and mechanisms and more particularly to control lever and linkage systems having multiple control elements moving in multiple planes.

BACKGROUND ART

Lift truck accelerator pedals are commonly pivotally mounted on the truck floorboard. Such pedals usually include an accelerator portion for controlling vehicle acceleration and a directional control portion for controlling vehicle forward and reverse direction. The directional control portion is usually mounted on the accelerator portion for relative movement therewith. This arrangement permits the vehicle operator to control vehicular forward and reverse direction as well as acceleration by means of a single foot control. Movement of the directional control portion provides direct contact with an exposed micro-switch mounted on or near the accelerator portion. An example of recent prior art pedals is disclosed in U.S. patent application Ser. No. 823,767, filed by Roy M. Gedeon, et al, on Aug. 11, 1977. Repeated direct contact with such switches acts as a catalyst to shorten switch wear life. Also, accumulation of debris in the area of the accelerator can cause interference with movement of the pedal or of portions of the pedal. Furthermore, such debris can interfere with the exposed microswitch to such an extent as to prevent direct contact with the directional control portion. Either shortened switch wear life or debris interference promotes the very undesirable condition of loss of directional control for the lift truck.

In view of the above, it would be advantageous to provide a control pedal having extended wear life and avoiding the problem of debris interference with switch actuation which overcomes problems associated with the prior art.

DISCLOSURE OF INVENTION

In one aspect of the present invention, the problems pertaining to the known prior art, as set forth above, are advantageously avoided by the present invention.

This is accomplished by providing a control pedal including an accelerator pedal portion having an improved member for actuating the directional control of the vehicle. The member is mounted on the accelerator pedal portion and has a first end protruding above the accelerator and a second end protruding below the accelerator. The member is mounted so that the second end reacts to move toward the accelerator when the first end is moved toward the accelerator.

As a result of the above-described invention, a directional control switch is mounted on the accelerator pedal portion and is actuated by a switch actuator mounted on the second end of the member in such a manner as to increase switch wear life and also avoid the commonly known problem of debris accumulation interfering with the switch actuation.

The foregoing and other advantages will become apparent from the following detailed description of the invention when considered in conjunction with the accompanying drawings. It is to be expressly understood, however, that the drawings are not intended as a definition of the invention but are for the purpose of illustration only.

BEST MODE FOR CARRYING OUT THE INVENTION

Figure 1:
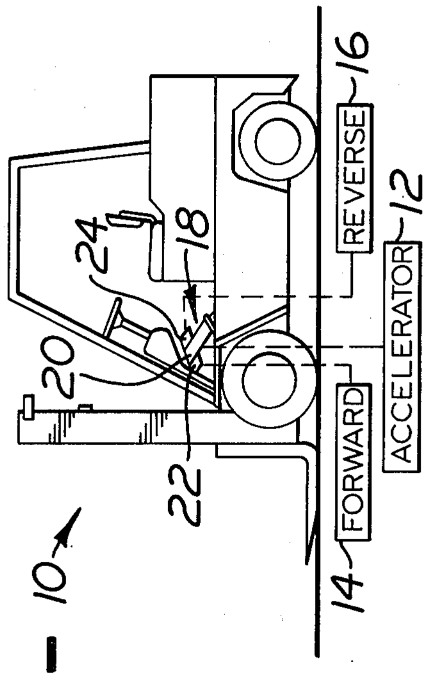
FIG. 1 is a view illustrating a lift truck having an accelerator pedal including directional control pedal portions.

Referring to FIG. 1, a vehicle, for example a fork lift truck, is designated 10 and includes a generally well known vehicle control system including an accelerator control 12 operably connected in the system. Also, a well known vehicle forward directional control 14 is operably connected in the system as is a well known vehicle reverse directional control 16.

Generally, a control pedal 18 is mounted on the vehicle and includes first means 20 on the pedal for actuating accelerator control 12. A second means 22 is mounted on the pedal for actuating the vehicle forward directional control 14. Also, a third means 24 is mounted on the pedal for actuating the vehicle reverse directional control 16.

The foregoing generally describes the well known single pedal control concept for actuating acceleration, forward direction and reverse direction.

Figure 3:
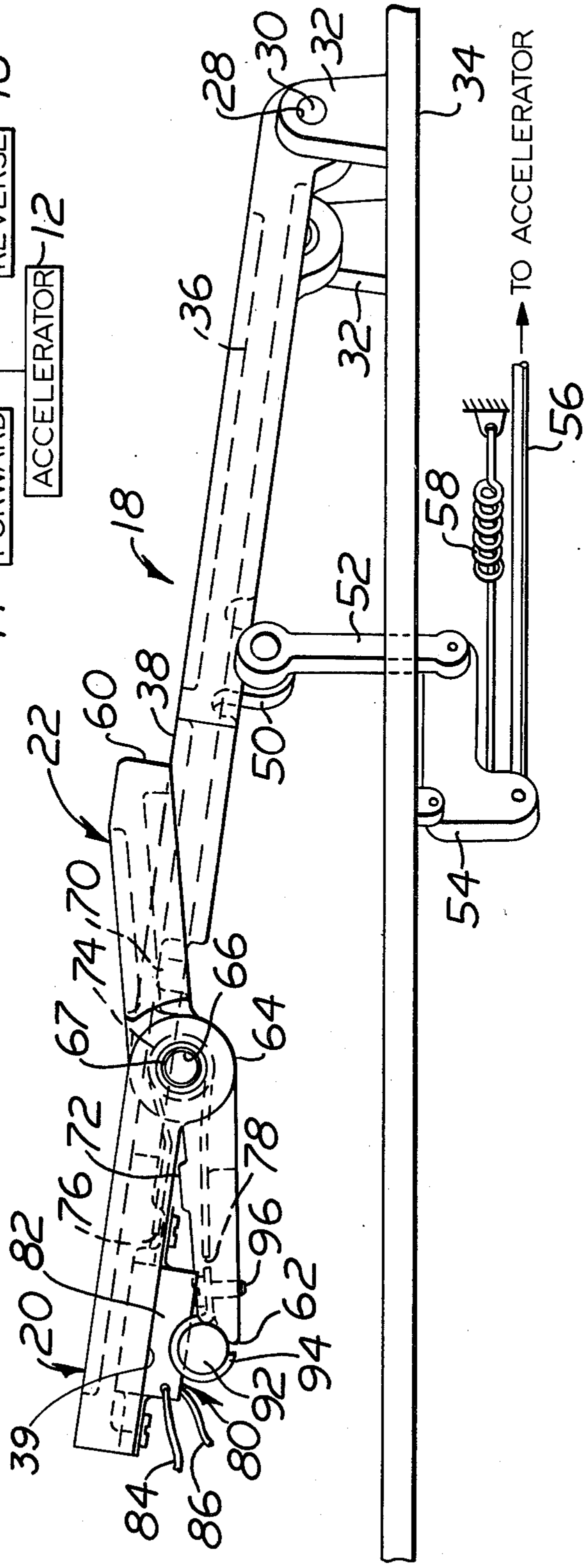
FIG. 3 is a side view illustrating the control pedal as seen from line III—III of FIG. 2.
Figure 2:
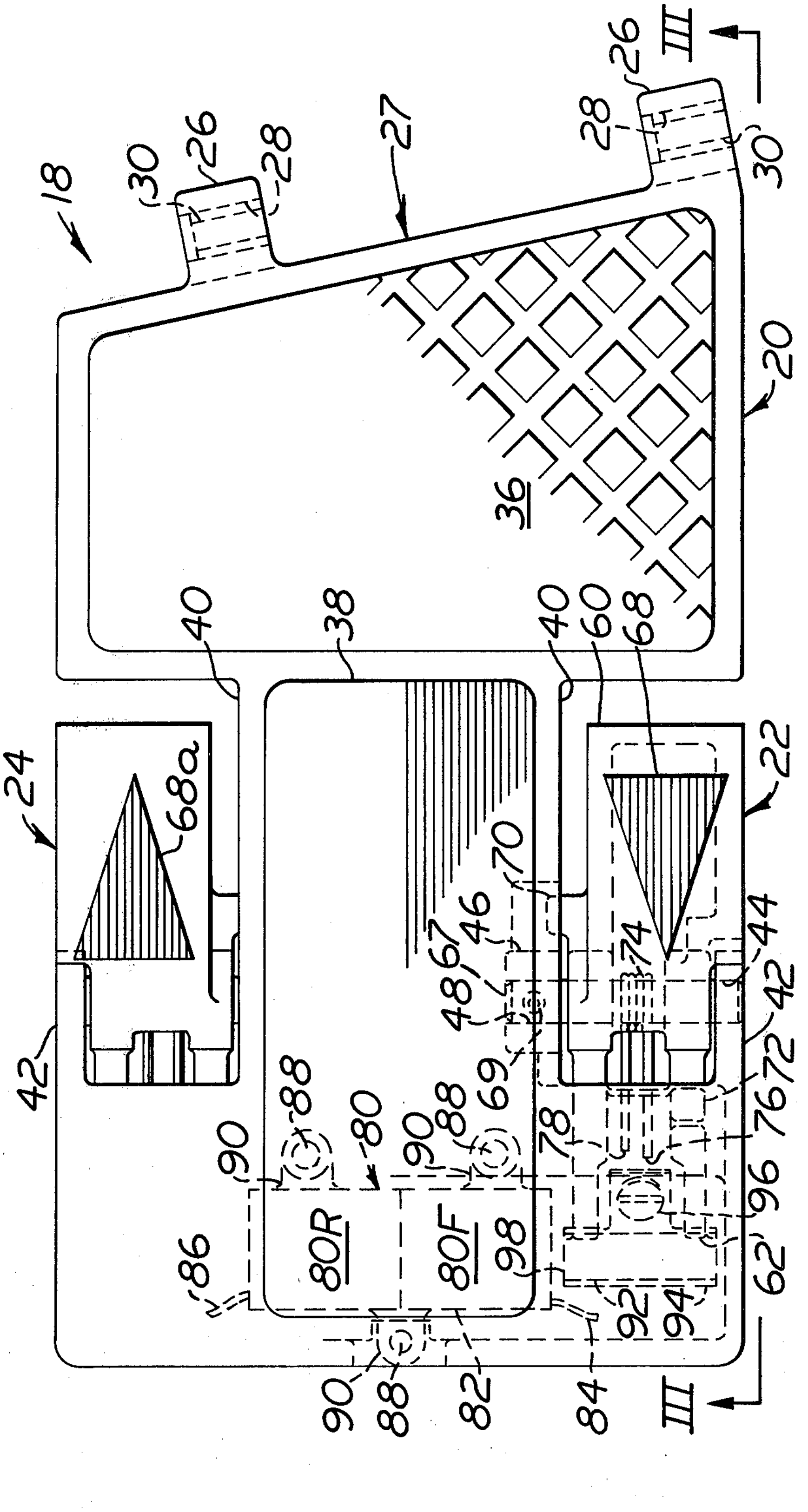
FIG. 2 is a plan view illustrating an embodiment of the control pedal of the present invention.

In this invention, control pedal 18, FIGS. 2, 3, includes accelerator portion 20 as well as means 22,24 for actuating directional control of vehicle 10. Accelerator portion 20 is preferably of cast aluminum although other materials may be used. Portion 20 includes nubs 26 at end 27 thereof. Each of the nubs 26 includes a bore 28 for accommodating a lubricated or bearing mounted pin 30 or the like for pivotally connected portion 20 of pedal 18 to flanges 32 on floorboard 34 in the well known manner.

A waffle-like substantially non-slip surface portion 36 is formed adjacent end 27 for accommodating the heel portion of the operator's foot. Surface 36 may be east into portion 20 or, alternatively, a rubber or synthetic insert may be applied to portion 20.

Extending from heel portion 36 is a portion 38 for accommodating the ball portion of the operator's foot. Portion 38 may similarly include a cast-in substantially non-slip surface or, alternatively, may include a rubber or synthetic insert.

Voids 40 are formed into portion 20 of pedal 18 adjacent portion 38 for accommodating the directional control portions 22,24 to be discussed later in greater detail. The voids 40 include a flange 42 having a bore 44 formed therein. Opposite flange 42 is a nub or flange 46 formed on the underside of portion 20 and having a bore 48 formed therein in axial alignment with bore 44.

A flange 50 is also formed on the underside of portion 20 providing for connection to the vehicle accelerator via links 52,54,56, resiliently urged by resilient means 58 in the well known manner.

Inasmuch as members 22,24 are substantially equivalents, only one member 22, will be described in detail. member 22 is also preferably of cast aluminum although it is recognized that other materials may be substituted. Member 22 is pivotally mounted on and movable relative to accelerator portion 20. Member 22 is substantially elongated and has a first end 60 and a second end 62. Between first and second ends 60, 62 is an enlarged portion 64 having a bore 66 formed therethrough. Bore 66 accommodates a lubricated or bearing mounted pin 67 or the like inserted into bores 44,48 for pivotally mounting member 22 on accelerator portion 20. Pin 67 is secured in place by set screw 69.

A substantially non-slip surface 68 is provided adjacent first end 60. Surface 68 is preferably a rubber or synthetic material insert applied to member 22 and formed in the shape of an arrowhead indicating the directional response which it is connected to control. Alternatively, surface 68*a* of member 24 indicates a directional response opposite to that of surface 68.

A nub or stop 70 is formed on member 22 between end 60 and portion 64 for engagement with accelerator portion 20 to limit upward movement of member 22 relative to portion 20. Similarly, another nub or stop 72 is formed on member 22 between end 62 and portion 64 for engagement with accelerator portion 20 to limit upward movement of member 22 relative to portion 20.

Resilient means such as steel spring 74 is preferably coiled around pin 67 and terminates at a first end 76 and a second end 78. First end 76 is urged into engagement with accelerator portion 20 and second end 78 is urged into engagement with member 22. In this manner, member 22 is resiliently mounted on accelerator portion 20 and biased so that first end 60 protrudes above accelerator portion 20 of pedal 18 and second end 62 protrudes below portion 20 of pedal 18. In this "at rest" or deactuated position, nub 70 is urged into contact with a portion of the underside of portion 20.

A switch control means 80 includes a pair of switching devices 80F, 80R each commonly known as a Hall Effect Switch. Each switch is mounted to the underside of accelerator portion 20 of pedal 18. Such a switch is sold by MICRO SWITCH as catalogue number 516SS series solid state switch. A switch is required for each direction to be controlled, i.e., forward and reverse. As used in this invention, switch 80F is mounted on portion 20 of pedal 18 adjacent second end 62 of member 22. also, switch 80R is similarly mounted adjacent member 24. Preferably, switches 80F, 80R are mounted in an epoxy-filled container 82 formed of a synthetic or other suitable material. Wires 84,86 electrically connect switches 80F, 80R with their respective portions of an electrically operated transmission of truck 10. Screws 88 are used to secure flanges 90 of container 82 to portion 20. In this manner, switch control means 80 is mounted on and movable with accelerator portion 20 of pedal 18.

A means for actuating switch control means 80, such as magnet 92, is mounted on and movable with second end 62 of member 22. Magnet 92 is mounted on the second end of each member 22,24 for movement relative to accelerator portion 20 and thus also movable relative to switch control means 80. Magnet 92 is secured on second end 62 by a retainer or clip 94, preferably of a synthetic material, which is mounted on member 22 by a screw 96, or the like. An end 98 of magnet 92 is spaced from switch 80F so that, as it is well known, movement of magnet 92 into proximity with switch 80F will actuate the switch and thus electrically control the direction of vehicle 10. The strength of magnet 92 needed to actuate switch 80F is dependent upon the size of magnet 92 and the spacing between end 98 and switch 80F when magnet 92 is moved to position adjacent switch 80F. Such a position is achieved when nub 72 engages the underside of accelerator portion 20. However, the magnet 92 must not be of such strength to actuate switch 80F when member 22 is in the "at rest" position wherein nub 70 engages the underside of pedal portion 20. It was found, for purposes of this invention, that a cylindrical magnet having a diameter of about 9.53 mm (0.375 inches) and a length of about 31.75 mm (1.25 inches) was sufficient to actuate switch 80F as desired when spaced from end 98 at about 1.59 mm (0.0625 inches). The shape of magnet 92 is not critical, although a cylindrical shape is convenient and is preferred.

INDUSTRIAL APPLICABILITY

A downwardly directed force applied to surface 68 of member 22 adjacent first end 60 causes member 22 to pivot about pin 67 relative to accelerator portion 20 so that magnet 92 adjacent second end 62 moves upwardly until stop 72 abuts the underside of accelerator portion 20. As a result, magnet 92 is moved into position adjacent switch 80F in switch control means 80, and thus switch 80F is actuated to signal the electrically operated transmission of vehicle 10 to direct vehicle 10 in a forward direction. Also, the entire pedal 18 including accelerator portion 20 and forward directional portion 22 can be pivoted about pins 30 to accelerate vehicle 10 in a forward direction.

Release of the force applied to surface 68 permits member 22 to be pivotally urged by resilient member 74 so that nub 70 engages accelerator portion 20. In this position, first end 60 protrudes above accelerator portion 20 and second end 62 protrudes below accelerator portion 20.

From the foregoing it can be seen that second end 62 moves in response to movement of first end 60. Thus, first and second ends 60,62, respectively, pivot simultaneously toward accelerator portion 20.

Force applied to member 24 results in similar action except that actuation of switch 80R results in directing vehicle 10 in a reverse direction.

Switches 80F, 80R are actuated without the need for direct contact with actuator magnets 92 thus making extended wear life a possibility due to the absence of direct switch contact known in prior art control pedals. Further, mounting switches 80F, 80R on the underside of accelerator portion 20 and mounting magnets 92 on second end 62 of member 22 which is under accelerator portion 20, offers protection from debris interference with switch actuation.

Other aspects, objects and advantages of this invention can be obtained from a study of the drawings, the disclosure and the appended claims.

What is claimed is:

1. In a vehicle (10) including a control pedal (18) having an accelerator portion (20), said accelerator portion (20) including a foot contact surface (38) and an underside surface (39), the improvement comprising:

a switch (80) mounted adjacent the underside surface (39);

a switch actuator (92); and means (22) for moving the switch actuator (92) relative to the switch (80), said means being connected to the accelerator portion (20) and having one end (62) including the switch actuator (92) adjacent the underside surface (39) and another end (60) adjacent the foot contact surface (38), said one end (62) movable toward the underside surface (39) adjacent the switch (80) in response to movement of the other end (60).

2. The apparatus of claim 1 wherein:
the means (22) for moving the switch actuator (92) is resiliently biased for maintaining the other end (60) in raised relationship relative to foot contact surface (38).

3. The apparatus of claim 1 wherein:
the means (22) for moving the switch actuator (92) is pivotally and resiliently connected to accelerator portion (20).

4. A control pedal (18) comprising:
an accelerator portion (20) of the pedal (18) including a foot contact surface (38) and an underside surface (39);
a switch (80) mounted adjacent the underside surface (39);
a switch actuator (92); and
means (22) for moving the switch actuator (92) relative to the switch (80), said means being connected to the accelerator portion (20) and having one end (62) including the switch actuator (92) adjacent the underside surface (39) and another end (60) adjacent the foot contact surface (38), said one end (62) movable toward the underside surface (39) adjacent the switch (80) in response to movement of the other end (60).

5. The control pedal (18) of claim 4 wherein:
the means (22) for moving the switch actuator (92) is resiliently biased for maintaining the one end (62) spaced from underside surface (39) and for simultaneously maintaining the other end (60) in raised relationship relative to foot contact surface (38).

6. The control pedal (18) of claim 4 wherein:
the means (22) for moving the switch actuator (92) is pivotally connected to accelerator portion (20) and is resiliently biased for maintaining the one end (62) spaced from the underside surface (39).

7. The control pedal (18) of claim 4 wherein:
the means (22) for moving the switch actuator (92) is pivotally connected to accelerator portion (20) and is resiliently biased for maintaining the other end (60) in raised relationship relative to the foot contact surface (38).

* * * * *